United States Patent

[11] 3,580,669

[72] Inventor Robert S. Beeler
Brighton, N.Y.

[21] Appl. No. 764,558
[22] Filed Oct. 2, 1968
[45] Patented May 25, 1971

[73] Assignee Eastman Kodak Company,
Rochester, N.Y.

[54] FILM-SOUND SYNCHRONIZING SYSTEM
9 Claims, 3 Drawing Figs.

[52] U.S. Cl. 353/15
[51] Int. Cl. G03b 31/00
[50] Field of Search 353/15, 16; 352/17

[56] References Cited

UNITED STATES PATENTS

| | | | |
|---|---|---|---|
| 2,498,070 | 2/1950 | Coleman | 353/16 |
| 2,811,588 | 10/1957 | Julie | 353/15 |
| 3,110,216 | 11/1963 | Chalfin | 353/15 |
| 3,187,626 | 6/1965 | Mindell et al. | 353/15 |

*Primary Examiner*—Harry N. Haroian
*Attorneys*—Robert W. Hampton and Ronald S. Kareken

ABSTRACT: A unit for synchronizing a sound recording with photographic projection employing an audible device to record a signal. A light responsive to the recorded signal in playback actuates a photoswitch coupled with a projector advance mechanism to operate the projector.

ROBERT S. BEELER
INVENTOR
BY Ronald S. Kaulen
Robert W. Hampton
ATTORNEYS

FILM-SOUND SYNCHRONIZING SYSTEM

BACKGROUND OF THE INVENTION

1. Field of the Invention

The present invention relates to sound-optical image recording systems and more particularly to a synchronization unit to coordinate sound apparatus such as a tape recorder with photographic apparatus such as a still picture projector.

2. Description of the Prior Art

Numerous systems which enable synchronization of a tape recording with either the cycling mechanism of a slide projector or with the advancement mechanism of a film strip projector are known. While, in general, the systems have performed adequately, they are subject to deficiencies to a degree either in reliability of operation i.e., response to spurious signals, excessive cost, or in interchangeability between various tape recorders and photographic projectors.

Many of the synchronizing devices now available on the market employ low frequencies, for example, in the range of from 30 to 120 Hz., to record a signal on the sound tape which controls advance of the projector. On the other hand, most moderately priced tape recorders attenuate frequencies below about 150 Hz. to reduce AC hum and component cost. Because relatively little voice or music recording is needed in this lower range, the speaker system need not reproduce sound in that range. Thus, the inability of the less expensive tape recorders to adequately reproduce the signals recorded at these low frequencies, the signal-to-noise ratio is extremely high, and the synchronization system often fails to operate or is operated through a false signal, in which case reliable synchronization often is not obtained.

Even synchronization systems which use higher frequency control signals, for example, in the range of 1,000 Hz., employ an approximate sine wave recording. As many recorders have a relatively low response to the particular signal, the pure sine wave sound form can often cause the same difficulties as with low frequency recording. A similar problem exists with respect to very high frequencies as, for example, 6,500 Hz., particularly when the tape recorder is played at low speeds.

In many cases also, a common electrical ground is required in employing a synchronizer unit for the tape recorder and projector. However, the common ground often results in ground loops, hum, and improper operation of the synchronizing system. This occurs particularly when an electrical connection is provided between the tape recorder and the projector with which it is synchronized.

A further difficulty experienced with many of the systems of the prior art is the inability of the operator to easily ascertain that the two systems are working together properly. The systems of the prior art have not been designed to provide visual, sound, or pressure indication of the operation of the system. Provision of such indications would be particularly valuable to an operator in recording synchronization signals.

SUMMARY OF THE INVENTION

In accordance with the present invention, a sound projection synchronization system has been developed which is extremely low in cost, simple to operate, reliable in operation, and adaptable for use with most tape recorders and film projectors of the slide projection of film strip projection type.

In a preferred embodiment of the invention, the synchronization system is employed with a multiple track tape recorder, on one track of which a control signal is recorded to control advancement of a film projector, The control signal is a sound producing buzzer which is generally operated in the range of from 170 to 1,000 Hz. Because a buzzer is employed, in place of the oscillator or other systems of the prior art, the signal can be felt and heard. Additionally, the buzzer provides, rather than a simple sine wave signal, a signal which is rich in harmonics so as to provide more reliable operation in tape recorders that might have a low response at the signal fundamental.

The buzzer is provided by conventional dry cells and activation, for recording, is by a standard electrical switch. The control signal recording for high-level or 600-ohm recording inputs is taken from the two ends of the buzzer coil winding and generally provides a nominal signal level of approximately 1 volt. When the buzzer signal is to be recorded through a microphone input, a signal is taken from a tap on a coil, or secondary winding, of the buzzer to provide a lower signal level of about 30 to 50 millivolts.

Additionally, this buzzer signal can be recorded on the magnetic tape by placing the buzzer near a microphone which is connected to the tape recorder. This eliminates the direct electrical connection to the recorder and the signal transmittal is accomplished by ordinary sound microphone means.

For playback, a small lamp is connected to the low-impedance output of the tape recorder amplifier. When the recorded control signal is played by the tape recorder amplifier, the lamp lights. This lamp is placed adjacent a photoelectric switch, such as a solid state photoswitch, which has sufficient switching capacity to control advance of the projector by closing the projector cycling circuit.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawing, in which.

DESCRIPTION OF THE PREFERRED EMBODIMENTS

Because tape recording devices, photographic projectors and synchronization units are well known, the present description will be directed in particular to elements forming part of, or cooperating more directly with, the present invention, elements not specifically shown or described herein being understood to be selectable from those known in the art.

Figure 1:
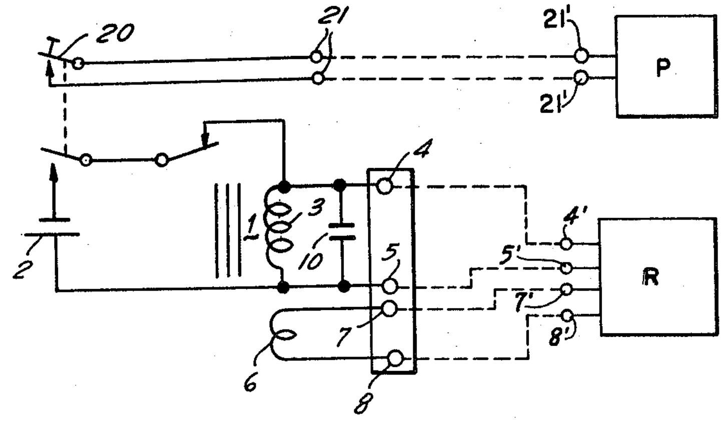
FIG. 1 is a schematic diagram of a record circuit according to the present invention.

Referring to the accompanying drawing, FIG. 1 shows a tape recorder R, a photographic projector P, and a buzzer, generally designated 1, in series connection with a low voltage power source 2 such as a dry cell. The buzzer includes coil 3 which may be connected, as shown at points 4 and 5, directly to the tape recorder high impedance level input 4′ and 5′. The buzzer also includes secondary coil 6 connected, as shown at points 7 and 8, to a standard microphone input 7′ and 8′ to the tape recorder R. A capacitor 10 is shown connected in parallel with coil 3. The function of this capacitor is to clip the peaks of voltage, if necessary, to prevent damage to certain tape recorders. Of course, this capacitor can be substituted with a diode, or with other means to effect a clipping of the voltage signal.

The buzzer circuit is activated through switch 20 a double-pull single-throw, normally open switch. This switch is closed when it is desired to record a control signal on the tape being recorded and, on closing, the buzzer signal is impressed on one of the tape channels, either through the high-level output coil 3 or through the microphone level coil 6. As previously mentioned, a microphone can actually be placed adjacent to the buzzer so that the control signal is recorded as a normal audible recording.

The second circuit actuated by switch 20 is the circuit which actuates cycling of the slide or film strip projector P. Leads 21 for connection to leads 21′ of this projector cycling circuit are shown. To record the signal, however, it is not necessary to connect the projector, since the operator will be aware of the recorded signal from the audible sound produced by the buzzer.

In FIG, 2 a playback circuit according to the present invention is shown, including lamp 30 electrically connected by leads 31 to the low impedance output leads 31' of the tape recorded amplifier. This lamp is illuminated in response to control signals recorded as described with respect to the record circuit FIG. 1. When the lamp is illuminated it triggers photoswitch 32 which is in electrical connection, through leads 33 and 33' with the cycling mechanism of the film strip or slide projector. The capacity of this photoswitch must be such as to close the cycling circuit and cause cycling of the projector. In the illustrated embodiment the photoswitch is a GE–X2A, wherein the gate is not employed.

Figure 2:
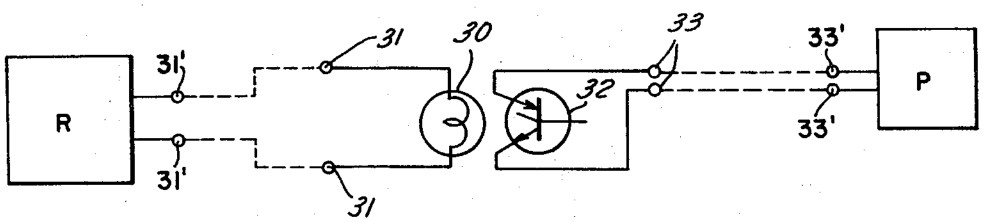
FIG. 2 is a schematic diagram of a playback circuit in accordance with the present invention.

The record and playback units may be entirely separate, and their circuitry entirely separated, as shown for FIGS. 1 and 2. However, it is often convenient to combine the two units into a single structure and, insofar as possible to combine the circuitry for the two units. Such a combined unit is more fully illustrated in FIG. 3.

Figure 3:
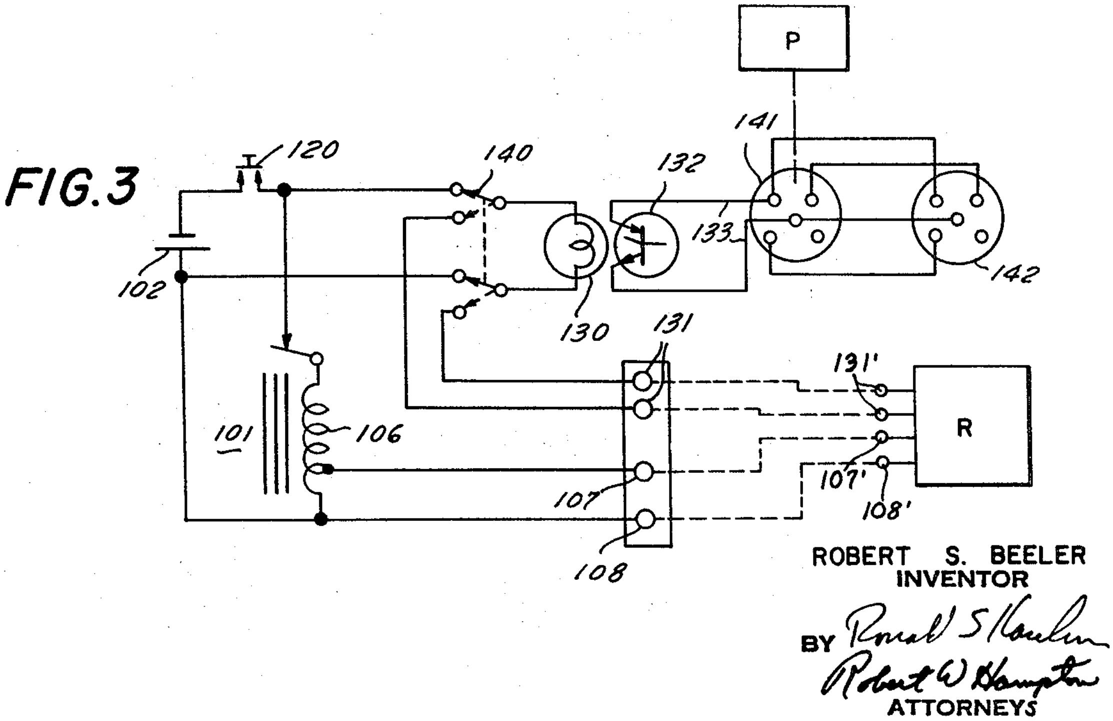
FIG. 3 is a schematic diagram of a combined record and playback circuit including a remote control for the projector, all in accordance with the present invention.

In FIG. 3, a buzzer, generally designated 101, is again shown in series connection with a source of low voltage electrical power 102. In this embodiment the buzzer is shown connected by coil 106 to the microphone level outputs at leads 107 and 108 for connection to microphone input leads 107', and 108' of recorder R. It should, of course, be understood that the buzzer can be employed, through proper connections, in the same manner as described for the record circuit of FIG. 1.

A double-pole, double-throw switch 140 is the control whereby the unit is placed in a record mode or in a playback mode. As illustrated in solid lines in FIG. 3, the switch is so connected as to provide for recording of control signals. In the illustrated embodiment, both the buzzer 101 and a lamp 130 are actuated through closing of the circuit by means of a single-pull, single-throw normally open switch 120. Thus, when switch 120 is actuated, the buzzer circuit is closed to record a signal on one channel of a magnetic tape in the tape recorder R and, simultaneously, the circuit for lamp 130 is closed to provide for cycling of the advance mechanism of a slide projector or film strip projector P. The cycling is accomplished through photoswitch 132 which is in series connection, by leads 133, with projector plug 141. The plug is electrically connected, through known means not shown, to the cycling mechanism of the projector. In this embodiment, a remote control receptacle 142 is also provided so that the cycling mechanism of the film projector can be advanced in a known manner independently of the synchronizing control.

When it is desired to employ the combined record and playback unit of FIG. 3 for playback, the double-pull, double-throw switch is placed in the dotted line position shown in FIG. 3. With the switch 140 in this position the circuit including switch 120 and buzzer 101 is made inoperative. On playback of the recorded tape, signals from the low impedance speaker output of the tape recorder R are transmitted by contacts 131'–131 to lamp 130 so as to light the lamp and actuate the projector cycling mechanism by photoswitch 132. Thus, it can be seen that even when the record and playback circuits are placed in a single unit, the electrical circuits of the recorder and projector are independent.

In the preferred embodiment, the source of power generation for the buzzer is generally a dry cell of from 1½to 3 volts. The buzzer coil winding is so formed and the tap so located as to provide for a nominal signal level of about 1 volt, r.m.s., for high impedance level or 600-ohm recording inputs. The secondary coil employed for microphone inputs provides a nominal signal level of about 30 to 50 millivolts, r.m.s. As shown in FIG. 1, particularly, a capacitor is provided to reduce the spikes in some buzzer wave form patterns. With some tape recorders, this is necessary to avoid damage. As previously explained, however, the "clipper" need not be a capacitor, but can take the form of a diode or other known means. Further, in many cases such a clipper is not necessary. With the dry cell of 1.5 to 3.0 volts, and employing a buzzer generating a sound signal at from 175 to 1,000 Hz. the capacitor can conveniently have a value of 0.05 mfd.

The buzzer employed is generally adjustable within the 175 to 1,000 Hz. range by adjustment of the contacts. If desired, a number of projectors could be controlled from a single record channel through the recording of multiple tones on the tape channel, i.e., control signals of different frequencies, and providing a filter circuit to separate these ranges on playback. Thus, several lamp and photoswitch combinations would be provided and the particular lamp illuminated would depend upon the frequency of a particular control signal.

In the playback mode, employing the structure of the present invention, the low impedance output of the tape recorder is connected to a lamp, which can be a standard miniature screw-base lamp socket with a 0112 or 0122 lamp. A photoswitch is placed directly in front of this lamp, as illustrated in the drawings, and can be silicon-controlled rectifier with a clear top having the requisite sensitivity and switching capacity. With the 0112 or 0122 lamps, a GE–X2A photoswitch has been found satisfactory. The gate of this photoswitch is unconnected.

A very brief signal is all that is necessary to actuate this photoswitch and thus the life of the low voltage dry cell battery would be relatively long. This lamp-photoswitch means of controlling cycling of the film projector is extremely advantageous in that it acts to filter out extraneous signals which may be recorded on the tape or appear in the recorder output as the result of use of other electrical equipment. The low-voltage incandescent lamp filters out these extraneous signals as their duration is too short for the filament to reach incandescence, so that the photoswitch is not activated. Normally, about one twenty-fifth second signal duration is required to light the lamp and the extraneous signals are generally shorter than this.

The device described requires a signal amplifier capable of delivering only about one-half to 1 watt at low voltage. Thus, practically any tape recorder with a low-impedance output is satisfactory. If the playback volume is advanced too far, the lamp may burn out, but the lamps described are extremely inexpensive and can be changed without undue difficulty. The lamps described have a nominal rating of 2.2 volts at one-fourth ampere. With the lamp and photoswitch placed in close proximity, voltages in the range of from 1 to 3 volts will result in tripping. If the control signals are not excessively long, the lamp will not be overloaded so as to burn out even if the voltage is higher than the rating. Further, as the photoswitch requires a relatively high level for activation, ordinary room light, in the order of 35 foot candles, will not activate it.

While particular lamps and photoswitches have been shown and described, it should be understood that the capacity of the lamp and the photoswitch are to be selected dependent upon the requirement of the particular tape recorders and film projector cycling mechanisms employed. For example, when a film projector requires a switching capacity higher than that inherent in the GE–X2A photoswitch, then higher capacity photoswitches may be employed in conjunction with a lamp having the requisite illumination for actuating such a photoswitch.

With remote control connections provided, as shown in FIG. 3 the projector can be controlled, as for focus and reverse-forward directioning, by known means. Additionally, should there be some malfunction in the unit, the cycling switch of the remote unit can be employed for correction. This latter feature is advantageous should it be desired to vary the sequence of the films being projected during playback of the tape. As the synchronizing system described is not frequency selective, it will operate from any signal reproduced with sufficient power to light the signal lamp. Thus, the signal can be recorded from other means, as with the audio oscillators employed in some prior art systems, and other signal sources. Thus, the playback unit is compatible with many systems of the prior art.

The invention has been described in detail with particular reference to preferred embodiments thereof, but it will be understood that variations and modifications can be effected within the spirit and scope of the invention.

I claim:

1. For synchronizing a sound recording on at least one channel of a multichannel recording device and a photographic apparatus having a cycling mechanism a control device comprising:
   a. buzzer means having a coil;
   b. electrical means to connect said buzzer coil to a high impedance level input of a multichannel recording device for recording a control signal on a channel separate from the sound recording channel;
   c. a voltage clipper connected in circuit with the buzzer and high-level input; and
   d. circuit means including a switch for actuating said buzzer for recording said control signal.

2. A synchronizing unit for synchronization of an audible recording on a sound recorder with a photographic apparatus having an operating mechanism, the unit comprising:
   a. first circuit means for recording a control signal on one channel of a multichannel recording including:
      i. a sound producing buzzer,
      ii. means to receive a low voltage source of electrical potential,
      iii. a switch for electrically connecting said buzzer and said source of electrical potential, and
      iv. means to electrically connect said buzzer to an input of a sound recorder to record a control signal; and
   b. second circuit means for playback including:
      i. illuminating means electrically connected to a low-impedance output of said sound recorder and illuminated by recorded control signals,
      ii. a photoswitch operable in response to illumination of said illuminating means, and
      iii. means to electrically connect said photoswitch to a photographic apparatus operating mechanism.

3. The synchronizing unit of claim 2 wherein said first circuit means includes means connectable to the photographic apparatus for actuating the operating mechanism.

4. The synchronizing unit of claim 2 wherein said means electrically connecting said buzzer electrically connects said buzzer to a high-impedance level input of the sound recorder.

5. The synchronizing unit of claim 4 and further comprising clipper means to reduce voltage peaks from said control signal.

6. The synchronizing unit of claim 2 wherein said means electrically connecting said buzzer connects said buzzer to a microphone input of the sound recorder.

7. Sound-optical image synchronizing apparatus comprising in combination:
   a. a sound recorder having means to receive a sound recording medium for recording and playing back sound, the recorder having at least one recording input operative in a record mode and at least one audio output operative in a playback mode;
   b. a photographic projector having an image changer mechanism and means to actuate the changer mechanism;
   c. a sound producing buzzer including a coil and electrical circuit means connecting the buzzer to the recording input, the circuit means including a source of electrical potential and a switch to selectively operate the buzzer and produce a sound signal of multiple frequencies for recording on a received sound recording medium where the recorder is in the record mode;
   d. means for producing a light illuminated by a recorded sound signal when the recorder is in playback mode;
   e. photoswitch means operable in response to illumination of the light; and
   f. means connecting the photoswitch means to the projector to actuate the changer mechanism in response to operation of the photoswitch means.

8. The combination according to claim 7 and further comprising projector switch means operatively associated with the electrical circuit means to actuate the changer mechanism with selective operation of the buzzer.

9. The combination according to claim 7 wherein the sound recorder includes a high-impedance level input and a microphone input, the electrical circuit means electrically connecting a first portion of the buzzer coil to the high-impedance level input and a second portion of the coil to the microphone input.